United States Patent [19]

Riester

[11] Patent Number: 5,503,045
[45] Date of Patent: Apr. 2, 1996

[54] DRIVE ASSEMBLY FOR CONTROLLING A POWERED DEVICE

[75] Inventor: Werner Riester, Müllheim, Germany

[73] Assignee: Werner Riester GmbH & Co. KG Armaturen- und Maschinenantriebe, Müllheim, Germany

[21] Appl. No.: 158,908

[22] Filed: Nov. 29, 1993

[30] Foreign Application Priority Data

Nov. 27, 1992 [DE] Germany .......................... 42 39 947.5

[51] Int. Cl.⁶ .............................. F16H 1/32; F16K 31/05; F16K 37/00
[52] U.S. Cl. ........................... 74/625; 192/141; 192/150; 251/80; 251/129.03; 251/249.5; 251/291; 475/4
[58] Field of Search ................................ 74/412 TA, 625; 475/4, 7; 192/150, 141, 142 R; 318/434, 488; 251/79, 80, 129.03, 249.5, 291, 292; 73/775, 168; 340/665; 307/124, 120

[56] References Cited

U.S. PATENT DOCUMENTS

| | | | |
|---|---|---|---|
| 2,452,178 | 10/1948 | Brownlee | 74/625 |
| 3,915,015 | 10/1975 | Crane | 73/432 R |
| 4,111,070 | 9/1978 | Stratienko | 74/625 X |
| 4,474,078 | 10/1984 | Denkowski et al. | 74/625 |
| 4,616,528 | 10/1986 | Malinski | 74/626 |
| 4,738,438 | 4/1988 | Horie et al. | 269/136 |
| 4,760,989 | 8/1988 | Elliot | 251/129.03 X |
| 5,059,879 | 10/1991 | Watanabe | 318/603 X |

FOREIGN PATENT DOCUMENTS

| | | |
|---|---|---|
| 0010416 | 4/1980 | European Pat. Off. . |
| 2817307 | 10/1979 | Germany . |
| 2018937 | 10/1979 | United Kingdom . |

*Primary Examiner*—Charles A. Marmor
*Assistant Examiner*—Troy Grabow
*Attorney, Agent, or Firm*—Darby & Darby

[57] ABSTRACT

A drive assembly for a valve includes a motor, a transmission which is coupled to the motor and the valve, and a manual drive unit having a shaft which is arranged to be driven by a handwheel. The shaft has a small amount of axial play and is provided with a worm. The transmission includes a hollow gear having internal teeth coupled to the motor shaft and external teeth in permanent mesh with the worm. A membranous disc is mounted on the worm shaft in such a manner that the outer margin of the disc is held against displacement in axial direction of the worm shaft while the central portion of the disc adjacent the worm shaft is fixed against axial displacement relative to the worm shaft. However, the worm shaft can rotate relative to the disc. Strain gages in the form of strips are mounted on one side of the disc and are connected to an integrated circuit on the same side of the disc. During manual operation, the worm causes the worm gear to rotate so that the torque produced by the handwheel is transmitted to the motor shaft. On the other hand, when the motor runs, the worm is stationary and holds the worm gear against rotation. If the load on the motor increases, the worm gear is urged into firmer engagement with the worm because the increased load is transmitted to the worm via the motor shaft. This causes axial shifting of the worm shaft with an accompanying deformation of the disc. The deformation of the disc is sensed by the strain gages which generate signals repesentative of the increase in load.

32 Claims, 1 Drawing Sheet

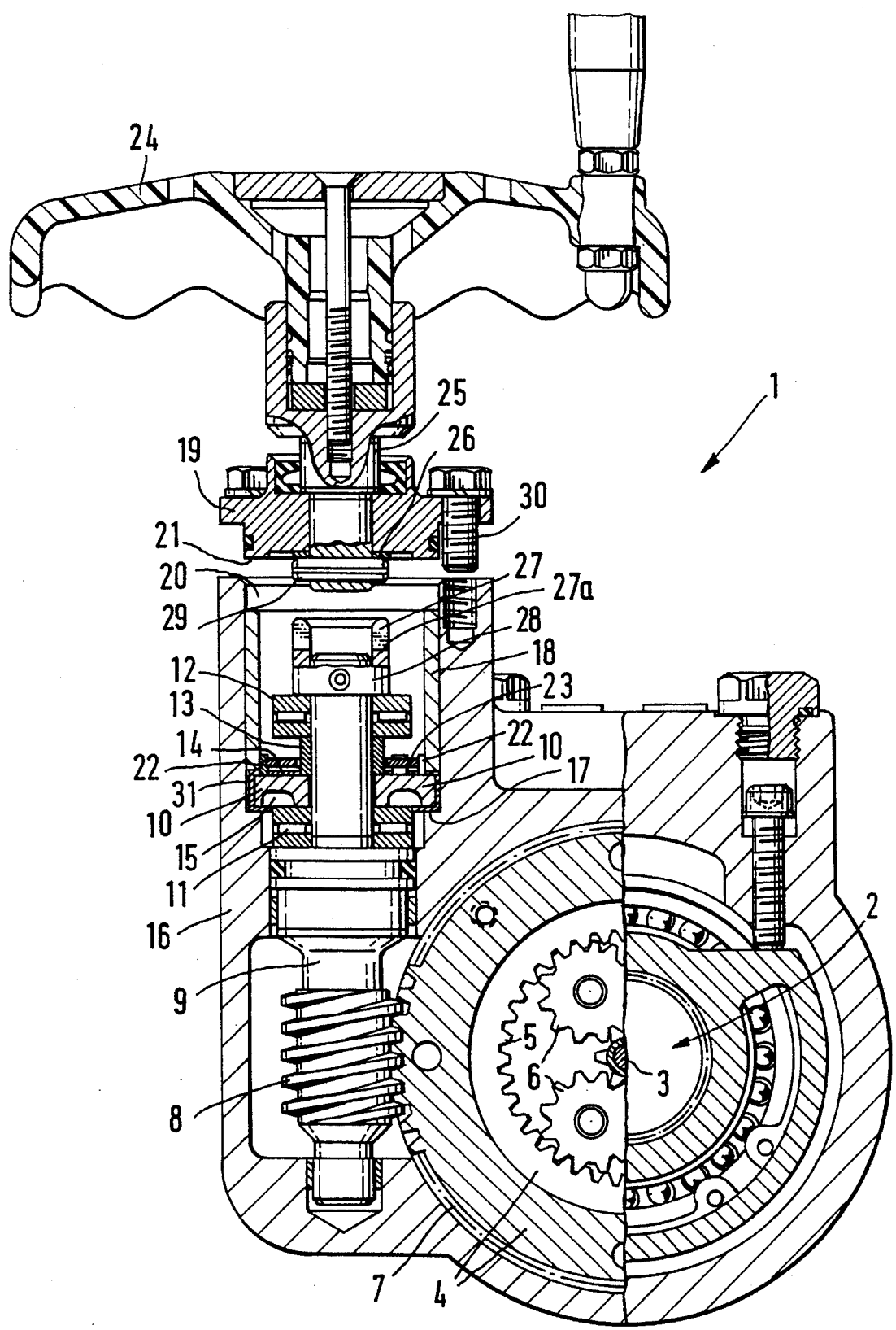

DRIVE ASSEMBLY FOR CONTROLLING A POWERED DEVICE

FIELD OF THE INVENTION

The invention relates to a drive assembly for controlling a powered device.

BACKGROUND OF THE INVENTION

A conventional drive assembly for controlling a powered device, e.g., a valve such as a slide valve or clack valve, has a motor and a transmission between the motor and the powered device. The transmission has a hollow gear which is provided with internal teeth for establishing a connection to the motor. The gear is also formed with external teeth which are designed so that the gear can function as a worm gear. The external teeth permanently mesh with a worm of a handwheel, i.e., with a screw thread on the shaft of the handwheel, and the gear is held in engagement with the worm by a self-locking action. When the motor operates, the worm holds the worm gear stationary.

Drive assemblies of this type have proved successful. In such a drive assembly, the motor should shut off automatically when the powered device operated by the motor generates an excessive reaction force as occurs, for instance, upon encountering an obstruction. Furthermore, it can be desirable to detect a torque increase in the transmission. For example, an increase in torque can indicate changes in a medium flowing through the powered device or increasing wear in the drive assembly.

To this end, the worm in mesh with the worm gear is resiliently mounted for axial displacement. When the worm has shifted a predetermined distance, a limit switch, potentiometer or inductive distance recorder is activated.

Only a single point can be detected with a limit switch. On the other hand, although a potentiometer permits more than one point to be detected, relatively large displacements of the order of millimeters are required. The same applies for distance recorders. Moreover, all of these mechanisms yield an indirect measurement of torque or force. This is so because a reaction force is indicated by means of springs in response to axial shifting of the worm.

A substantial drawback of these indirect measuring units is that relatively large displacements of the worm are required. In addition, the measurements are a function of the spring constants which can vary, e.g., as the springs age. Furthermore, too large a reaction force is indicated upon fracture of a spring since a larger displacement then occurs.

The conventional drive assemblies also have the drawback that many coupling elements are required between the displaceable worm and the associated measuring, indicating and control units. The large number of coupling elements is not only costly but takes up a considerable amount of space and can result in inaccuracies due to tolerances and friction. Further, these inaccuracies increase over time because the coupling elements undergo wear.

SUMMARY OF THE INVENTION

It is an object of the invention to provide a drive assembly which allows reaction forces to be measured with smaller displacements.

Another object of the invention is to provide a drive assembly which enables increasing resistance between a motor shaft and an output of a transmission to be detected with greater precision.

An additional object of the invention is to provide a drive assembly which can detect increasing resistance between a motor shaft and an output of a transmission with a relatively high degree of accuracy using a reduced number of parts and indicators.

A further object of the invention is to provide a drive assembly of the type outlined above which makes it possible to reduce the displacements required for measurement of reaction force while, at the same time, allowing reaction force to be measured with improved precision using relatively few parts and indicators.

The preceding objects, as well as others which will become apparent as the description proceeds, are achieved by the invention.

One aspect of the invention resides in a drive assembly for controlling a powered device, particularly a valve such as a slide valve or clack valve. The assembly comprises a shaft arranged to regulate the device, means for driving the shaft, and means for indicating loading of the shaft. The indicating means includes a deformable member on the shaft, and at least one element on the deformable member for detecting strain.

The deformable member may be a membranous disc and preferably consists of a hard material. The detecting element, which may be in the form of a strip, can be mounted on one side of the disc.

At least part of the disc may be fixed against displacement in axial direction of the shaft. It is preferred for the marginal portion or margin of the disc, which is located radially outward of the shaft, to be fixed against such displacement. The portion of the disc adjacent the shaft is advantageously held against axial movement relative to the shaft.

The means for driving the shaft may include a handwheel. The drive assembly can further comprise a motor, and a transmission between the motor and the powered device controlled by the drive assembly. The transmission may include a hollow gear having internal teeth for establishing a connection to the motor. The gear may further be provided with external teeth which are designed in such a manner that the hollow gear can function as a worm gear. The shaft is then formed with a screw thread or worm. The worm gear and worm are in mesh, preferably permanently, and the worm gear may be held in engagement with the worm by a self-locking action. The worm maintains the worm gear stationary while the motor runs.

If the torque changes while the motor is running during normal operation of the drive assembly, a corresponding change in the force of engagement between the worm gear and the worm takes place and results in axial displacement of the worm. Due to this displacement, the membranous disc is deformed in its elastic range and causes the strain detecting strip to be activated. A very small displacement of the worm in the micrometer range suffices to activate the detecting strip. By way of example, the unavoidable axial play in bearings for shafts can lie in the micrometer range and is enough to cause activation of the detecting strip. By establishing a connection with an appropriate electronic processing or evaluating circuit, it is possible to expeditiously derive measurements representing even the most minute deformations of the disc resulting from axial displacements of the worm.

The drive assembly may include a housing for the worm and its shaft and it is preferred for the margin of the membranous disc to be held at the inner side of the housing. This allows the margin of the disc to be fixed in a simple fashion. Upon relative movement of the worm and the housing, the desired deformation of the disc, and thus of the detecting strip or strips provided on the disc, is obtained. The worm for the handwheel can accordingly have axial play but is connected to the membranous disc without play.

As a rule, the resistance of the detecting strip or strips changes in response to deformation.

The detecting strip or strips can be printed on and baked into the disc and thereupon connected to the electronic processing circuit. The connection can be established in a minimum amount of space by providing the disc with an electrical connecting element which holds a circuit board having an integrated amplifying circuit. The connecting element can be a socket and is advantageously located on the same side of the disc as the detecting strip or strips. The circuit board with the integrated circuit is preferably arranged parallel to the disc at a small spacing therefrom. By designing the electronic processing circuit as an integrated circuit board which is parallel or approximately parallel to the disc, the processing circuit can be placed in the worm housing so that it requires practically no additional space.

Since the invention eliminates indirect measurement of displacement via springs, the mechanical zero point of the overall driving and measuring system can be brought into coincidence with the initial zero point of the actual measuring unit. Hence, following assembly, any such drive allows precise measurements to be obtained.

In accordance with a particularly advantageous embodiment of the invention, the handwheel and the worm shaft are designed to be coupled to one another for rotation while remaining uncoupled axially of the worm shaft. This makes the measuring unit largely independent of external influences. Loads acting on the handwheel, especially loads acting in axial direction of the worm, are not transmitted to the membranous disc. It is even possible to step on the handwheel, e.g., with larger powered devices, without falsifying the measurements despite the fact that the axis of the handwheel and that of the worm shaft coupled thereto may be vertical. Thus, such loading of the handwheel is not transferred to the worm shaft, and hence not to the membranous disc. This is of great importance since even the smallest deformation of the detecting strip or strips caused by deformation of the disc results in distinct resistance changes in the associated measuring circuit and correspondingly distinct indications of deformation.

The handwheel may be provided with a stub and the stub can be rotatably mounted on the worm housing via a bearing, preferably an axial bearing. The end of the stub which faces the worm may be provided with a coupling element for firmly connecting the stub and the worm shaft for rotation. The coupling element can resemble a claw and may be in the form of a radially projecting protrusion. For instance, the coupling element can be constituted by a pin which extends transversely of the stub. The end of the worm shaft which faces the stub may be provided with a coupling element designed to cooperate with that of the stub. When the coupling element of the stub is in the form of a radially projecting protrusion, the coupling element of the worm shaft can take the form of a slot which extends radially of the worm shaft. The protrusion and the slot are designed so that the protrusion is snugly received in the slot but is spaced from the bottom of the slot. This construction allows the handwheel to be coupled to the worm shaft for rotation therewith while the worm shaft remains essentially free of engagement with the handwheel in axial direction of the worm shaft.

The clamped margin of the membranous disc may be provided with a plastic embedment or casing. This permits clamping of the margin to be improved and clamping precision to be increased. By virtue of the plastic embedment or casing, manufacturing tolerances have no significant adverse effects and subsequent soiling of the marginal region, which can falsify the measurements, may be avoided.

The drive assembly of the invention provides substantial advantages as regards measurement precision, compactness and ease of manufacture and installation. Furthermore, the drive assembly not only permits continuous direct measurement of reaction forces to be achieved but also establishes an additional function for the worm shaft of the handwheel. Normally, such a worm shaft is hardly used since it is provided only for emergencies. In accordance with the invention, the worm shaft is now employed constantly to measure the reaction force at the output of the transmission and to indicate eventual changes in the reaction force. Not only can the reaction forces during normal operation of the motor be measured but also the reaction forces during emergency manual operation. All of the enumerated advantages are achieved with very few parts and minimal space requirements.

BRIEF DESCRIPTION OF THE DRAWING

Additional features and advantages will be forthcoming from the following description of preferred embodiments when read in conjunction with the accompanying drawing.

The single FIGURE is a sectional view of a drive assembly according to the invention.

DESCRIPTION OF PREFERRED EMBODIMENTS

In the sole FIGURE, the reference numeral 1 generally identifies a drive assembly which is here assumed to control a powered device such as, for instance, a slide valve or a clack valve. The drive assembly 1 includes a transmission 2 whose left half is sectioned in a first plane and whose right half is sectioned in a different second plane. A central shaft 3 is visible in the left half of the transmission 2 and constitutes the output shaft of a motor forming part of the drive assembly 1. The transmission 2 is interposed between the motor and the device controlled by the drive assembly 1.

The transmission 2 comprises a hollow gear 4 having internal teeth 5. The hollow gear 4 receives torque from the motor via toothed gears 6 which mesh with the output shaft 3 and the internal teeth 5 of the hollow gear 4.

The outer peripheral surface of the hollow gear 4 is provided with external teeth 7 which are designed so that the hollow gear 4 can serve as a worm gear. The teeth 7 of the worm gear 4 mesh with a screw thread or worm 8 formed on a shaft 9. The worm gear 4 and the worm 8 are in permanent engagement with one another, and the worm gear 4 is held against the worm 8 by a self-locking action. During normal operation of the motor, the worm gear 4 is thus arrested by the worm 8 via the external teeth 7 of the worm gear 4.

The worm shaft 9 is intended for manual operation of the drive assembly and constitutes part of a manual drive unit which further includes a handwheel 24 for driving the worm shaft 9 in rotation. When the worm shaft 9 is rotated via the handwheel 24, the worm gear 4 rotates through the agency of the worm 8 and the external teeth 7 of the worm gear 4. The rotary motion of the worm gear 4, in turn, is transmitted to the output shaft 3 by means of the toothed gears 6. The handwheel 24 is primarily for use in those rare cases where the motor becomes damaged or a power failure occurs.

The worm shaft 9 has a small amount of axial play. If different reaction forces arise at the input and output regions of the output shaft 3 during operation of the motor, the worm 8 and its shaft 9 are shifted axially by the worm gear 4 and its external teeth 7.

A membranous disc 10, which can consist of a hard material, is disposed on the worm shaft 9. The disc 10 has a radially inner or central portion adjacent to the worm shaft 9 and a radially outer or marginal portion which is located radially outward of the worm shaft 9. The central portion of the disc 10 is fixed against axial displacement relative to the worm shaft 9 by an axial bearing 11 situated on one side of the disc 10 and a bushing 13 which is disposed on the opposite side of the disc 10 and bears against a second axial bearing 12. The marginal portion of the disc 10 is fixed against displacement in axial direction of the worm shaft 9 in a manner still to be described.

One or more strain measuring strips 14 are provided on one side of the disc 10. The opposite side of the disc 10 is formed with a circumferentially extending, annular recess 15. The recess 15 improves the membranous deformability of the unsupported portion of the disc 10, that is, the portion of the disc 10 between the clamped central and marginal portions thereof.

The worm shaft 9 and membranous disc 10 are accommodated in a main section 16 of a housing forming part of the drive assembly 1, and the marginal portion of the disc 10 is gripped at the inner surface of the housing section 16. To this end, the inner surface of the housing section 16 is formed with a shoulder 17. One side of the marginal portion of the disc 10 rests on the shoulder 17 while the other side of the marginal portion is in contact with a sleeve 18 which is slipped into the housing section 16 through an opening 20 at the upper end of the housing section 16. This construction allows the marginal portion of the disc 10 to be clamped in simple fashion.

The sleeve 18 is fixed against displacement axially of the worm shaft 9 in a manner now to be described.

The opening 20 of the housing section 16 can be closed by a removable cover 19 which constitutes another section of the housing and, in the FIGURE, is lifted away from the opening 20. The cover 19 is provided with an abutment 21 which, when the cover 19 is closed, bears against the sleeve 18 thereby preventing the latter from shifting in axial direction of the worm shaft 9. Inasmuch as the cover 19 is removable, the sleeve 18 can be released and made easily accessible, e.g., in the event that the disc 10 or other parts of the manual drive unit require repairs.

Although the worm shaft has axial play, no play exists between the worm shaft 9 and the membranous disc 10. If forces are transmitted to the worm 8 via the worm gear 4, the worm shaft 9 undergoes small axial movements which result in membranous deformation of the disc 10. Even the most minute deformation is sufficient to cause the measuring strips 14 to generate measurements. Accordingly, even if the axial play of the worm shaft 9 lies in the micrometer range, good direct measurement of force and torque can be achieved.

The measuring strips 14 are printed or impressed on, and baked into, the disc 10 and are connected to an electronic evaluating or processing circuit. To this end, the side of the disc 10 with the measuring strips 14 is provided with an electrical connecting element or connection in the form of a socket or holder 22. The socket 22 holds a circuit board 23 having an integrated amplifying circuit in close proximity and parallel to the disc 10. Since the circuit board 23 is disposed parallel to the disc 10 at a small spacing therefrom, the entire measuring arrangement requires very little space.

The handwheel 24 is designed to be rotatably coupled to the worm shaft 9 while remaining uncoupled from the worm shaft 9 in axial direction of the latter. Thus, the handwheel 24 is connected with or coupled to a stub 25 which is rotatably mounted on one of the sections of the housing 16,19 by means of its own bearing 26. In the illustrated embodiment, the stub 25 is mounted on the cover 19 of the housing 16,19. The bearing 26 for the stub 25 is constituted by or includes an axial bearing.

The end of the stub 25 facing the worm shaft 9 has a coupling element for locking the stub 25 and the worm shaft 9 to one another for rotation. The coupling element of the stub 25, which can constitute or resemble a claw coupling, is in the form of a protrusion which projects radially beyond the stub 25. The protrusion includes or is constituted by a pin 29 or similar element which is transverse to the stub 25 and projects beyond the latter in radial direction of the stub 25.

A hollow coupling component 28, which can have a claw-like configuration, is mounted on the end of the worm shaft 9 confronting the stub 25. The coupling component 28, which is fixed against rotation and axial displacement relative to the worm shaft 9, is provided with a coupling element designed to cooperate with the pin 29 of the stub 25. The coupling element of the coupling component 28 is here in the form of a slot 27 which extends radially of the worm shaft 9.

In the coupled position of the stub 25 and the worm shaft 9, the pin 29 of the stub 25 is received in the slot 27 of the worm shaft 9 and is locked by the slot 27 as considered in circumferential direction of the stub 25 and the worm shaft 9. Accordingly, the stub 25 and the worm shaft 9 are connected to one another for rotation. However, the pin 29 is axially spaced from the bottom 27a of the slot 27.

Fastening screws 30 are provided to secure the cover 19 to the housing section 16. When the cover 19 is moved from the open position of the FIGURE to the closed position and the screws 30 are tightened, the pin 29 and slot 27 assume the coupled position in which the pin 29 is received in the slot 27. Rotary motion of the handwheel 24 can now be transmitted to the worm shaft 9. Since the pin 29 is axially spaced from the bottom 27a of the slot 27, this can be accomplished without transferring axial forces which may be exerted on the handwheel 24 to the worm shaft 9 and membranous disc 10.

As indicated above, the cover 19 for closing the housing section 16 of the manual drive unit contains the bearing location for the stub 25 of the handwheel 24. The coupling pin 29, which engages the worm shaft 9 via the coupling component 28 when the cover 19 is in the closed position of use, projects from the inner side of the cover 19.

The axial bearing 12 is disposed between the coupling component 28 and the bushing 13. The axial bearings 11 and 12 located on opposite sides of the disc 10 and its retaining bushing 13 permit the worm shaft 9 to rotate relative to the disc 10 without problem even though the disc 10 is fixed against rotation as well as axial displacement relative to the worm shaft 10. Thus, the manual drive unit can rotate the worm gear 4 of the transmission 2 without endangering the disc 10 in spite of the fact that the disc 10 is incorporated in such drive unit.

The margin of the disc 10 is provided with a plastic embedment or jacket 31. This makes it possible to compensate for inaccuracies or tolerances which exist in the region of the margin. Furthermore, the embedment or jacket 31 protects the area of the margin against dirt penetration so that the measuring arrangement can have a long life.

The manual drive unit and its worm shaft 9 have a constant additional function in the drive assembly 1 of the invention. Thus, by means of the manual drive unit and its worm shaft 9, reaction forces and changes in such forces arising in the transmission 2 are transformed at the disc 10 and displayed as measurements via an electronic processing circuit without the need for large displacements against resilient opposition.

In summary, the invention provides a drive assembly 1 for controlling or regulating powered devices such as, for example, slide valves and clack valves. The drive assembly includes a motor, and a transmission 2 between the motor and the powered device. In order to achieve a desired gear reduction, the transmission 2 is provided with at least one hollow gear 4 having internal teeth 5. The hollow gear 4 is further provided with teeth 7 on the outer peripheral surface thereof, and the teeth 7 are designed in such a manner that the hollow gear 4 can serve as a worm gear. The external teeth 7 of the worm gear 4 mesh with a worm 8 of a shaft 9 constituting part of a manual drive unit. The worm gear 4 is in permanent engagement with the worm 8 and, during normal operation of the motor, is supported against the stationary worm 8 by a self-locking action. A membranous disc 10 of hard material is mounted on the worm shaft 9, and the outer marginal portion of the disc 10 is fixed against displacement in axial direction of the worm shaft 9. The portion of the disc 10 adjacent the worm shaft 9 is held against axial movement relative to the worm shaft 9 although the latter can rotate relative to the disc 10. One or more strain measuring strips 14 are provided on at least one side of the disc 10 and are connected to an electronic processing circuit. When the force of engagement between the worm gear 4 and the worm 8 changes in response to torque variations and reaction force variations in the transmission 2, the worm shaft 9 is shifted axially. The strain measuring strip or strips 14 then generate changes in measurements even if the worm shaft 9 only undergoes a very minute displacement in the micrometer range.

Various modifications can be made within the meaning and range of equivalence of the appended claims.

I claim:

1. A drive assembly for controlling a powered device, comprising a shaft arranged to regulate the device; means for driving said shaft; and means for indicating loading of said shaft, said indicating means including a deformable member on said shaft, and an element on said member for detecting strain, said element being printed and baked onto said member.

2. The assembly of claim 1, wherein said member is membranous.

3. The assembly of claim 1, wherein said member comprises a disc.

4. The assembly of claim 1, wherein said member consists essentially of a hard material.

5. The assembly of claim 1, wherein said member has opposite sides and said element is disposed on one of said sides.

6. The assembly of claim 1, wherein said indicating means further comprises an electronic unit for processing signals from said element.

7. The assembly of claim 1, wherein said member has opposite sides and said element is disposed on one of said sides, said member being provided with a recess on the other of said sides.

8. The assembly of claim 7, wherein said recess is substantially annular.

9. The assembly of claim 1, wherein said member has a marginal portion radially outward of said shaft and another portion radially inward of said marginal portion, said marginal portion being fixed against displacement in axial direction of said shaft, said other portion being fixed against axial displacement relative to said shaft.

10. The assembly of claim 1, wherein said member comprises a membranous, disc-like member on said shaft consisting essentially of a hard material, and said member having a marginal portion radially outward of said shaft and another portion radially inward of said marginal portion, said marginal portion being fixed against displacement in axial direction of said shaft, and said other portion being fixed against axial displacement relative to said shaft, said member having opposite sides, and said indicating mean further including an element on one of said sides for detecting strain.

11. A drive assembly for controlling a powered device, comprising a shaft arranged to regulate the device; means for driving said shaft; and means for indicating loading of said shaft, said indicating means including a deformable member on said shaft, and an element on said member for detecting strain, said member being provided with an electrical connection and said indicating means further comprising an integrated circuit mounted on said connection.

12. The assembly of claim 11, wherein said member has opposite sides and said element and said connection are disposed on one of said sides.

13. The assembly of claim 11 wherein said connection comprises a socket.

14. The assembly of claim 11, wherein said circuit comprises an amplifier.

15. The assembly of claim 11, wherein said circuit is substantially parallel to said member and is disposed adjacent to the latter at a spacing therefrom.

16. A drive assembly for controlling a powered device, comprising a shaft arranged to regulate the device, said shaft having a longitudinal axis; means for driving said shaft, said driving means including a handwheel which is engageable with said shaft for rotation therewith while remaining substantially free of engagement with said shaft axially of the latter, and said handwheel being provided with a stub; a housing for said shaft; a bearing for rotatably mounting said stub on said housing, said stub and said shaft having cooperating coupling portions for rotatably connecting said stub and said shaft to one another; and means for indicating loading of said shaft, said indicating means including a deformable member on said shaft, and an element on said member for detecting strain.

17. The assembly of claim 16, wherein said shaft and handwheel permit manual regulation of the powered device controlled by said assembly, said assembly further comprising means for motorized regulation of the powered device.

18. The assembly of claim 17, wherein said means for motorized regulation comprises a motor; said assembly further comprising a transmission coupled to said motor, said transmission including a hollow gear having external teeth, and internal teeth for establishing a connection to said motor, said shaft having a screw thread which meshes with said external teeth.

19. The assembly of claim 16, wherein said bearing is an axial bearing.

20. The assembly of claim 16, wherein said coupling portions have an engaged position and a disengaged position, said coupling portions comprising a slot in one of said stub and said shaft and a protrusion on the other of said stub and said shaft, said slot having a bottom, and said protrusion being spaced from said bottom in said engaged position.

21. The assembly of claim 20, wherein said slot extends radially of said stub and said shaft, said protrusion comprising a pin extending radially of said stub and said shaft.

22. A drive assembly for controlling a powered device, comprising a shaft arranged to regulate the device, said shaft having a longitudinal axis; means for driving said shaft; and means for indicating loading of said shaft, said indicating means including a deformable member on said shaft, and an element on said member for detecting strain, said member having a marginal portion radially outward of said shaft which is fixed against displacement axially of said shaft, and said marginal portion being provided with a plastic covering.

23. The assembly of claim 22, wherein said shaft is mounted for axial play, and said member is mounted for substantially zero play relative to said shaft.

24. The assembly of claim 23, wherein said axial play is in the micrometer range.

25. The assembly of claim longitudinal axis and said member includes a marginal portion radially outward of said shaft; 22, further comprising a housing for said shaft, and a sleeve in said housing surrounding said shaft and arranged to be fixed against displacement axially thereof, said housing being provided with an internal shoulder, and said marginal portion being confirmed between said shoulder and said sleeve.

26. A drive assembly for controlling a powered device, comprising a shaft arranged to regulate the device, said shaft having a longitudinal axis; means for driving said shaft; means for indicating loading of said shaft, said indicating means including a deformable member on said shaft, and an element on said member for detecting strain, said member having a marginal portion radially outward of said shaft; a housing for said shaft; and a sleeve in said housing surrounding said shaft and arranged to be fixed against displacement axially thereof, said housing being provided with an internal shoulder and including a cover movable between an open position in which said sleeve is accessible and a closed position in which said sleeve is inaccessible, said marginal portion being confined between said shoulder and said sleeve, and said cover abutting said sleeve in said closed position.

27. The assembly of claim 26, wherein said shaft is mounted for rotation on said axis, at least part of said member being fixed against displacement axially of said shaft.

28. The assembly of claim 27, wherein said member has a marginal portion radially outward of said shaft and another portion radially inward of said marginal portion, said marginal portion being fixed against displacement in axial direction of said shaft, and said other portion being fixed against axial displacement relative to said shaft.

29. The assembly of claim 28, further comprising a housing for said shaft, said housing having an internal surface, and said marginal portion being fixed at said internal surface.

30. The assembly of claim 26, wherein said driving means comprises a handwheel.

31. The assembly of claim 26, wherein said driving means comprises a handwheel which is engageable with said shaft for rotation therewith while remaining substantially free of engagement with said shaft axially of the latter.

32. The assembly of claim 31, wherein said handwheel is provided with a stub; and said stub is rotatably mounted on said cover, said cover having an inner side which faces said shaft, and said stub and said shaft respectively being provided with first and second coupling portions for rotatably connecting said stub and said shaft to one another, said first coupling portion projecting from said inner side and being in engagement with said second coupling portion in said closed position.

* * * * *